(12) United States Patent
Boscovic et al.

(10) Patent No.: US 6,490,452 B1
(45) Date of Patent: Dec. 3, 2002

(54) GROUP HANDOVER IN A CELLULAR COMMUNICATIONS NETWORK

(75) Inventors: Dragan Boscovic, Saint Germain-en-Laye (FR); Doru Calin, Elancourt (FR); Francois Goeusse, Nozay (FR); Philippe Sartori, Chartres, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/488,890

(22) Filed: Jan. 21, 2000

(30) Foreign Application Priority Data

May 26, 1999 (EP) .............................................. 99401259

(51) Int. Cl.[7] .................................................. H04Q 7/20
(52) U.S. Cl. ........................ 455/436; 455/452; 455/519
(58) Field of Search ................................ 455/436, 437, 455/438, 439, 443, 444, 452, 453, 426, 518, 519, 512, 513

(56) References Cited

U.S. PATENT DOCUMENTS

| | | | |
|---|---|---|---|
| 4,573,206 A | 2/1986 | Grauel et al. ................... 455/33 |
| 5,701,586 A * | 12/1997 | Tabbane et al. ............ 455/33.4 |
| 5,898,925 A * | 4/1999 | Honkasalo et al. .......... 455/437 |
| 5,953,324 A * | 9/1999 | Adachi ......................... 455/436 |
| 6,006,093 A * | 12/1999 | Aalto et al. .................. 455/443 |
| 6,137,783 A * | 10/2000 | Sallberg ...................... 455/436 |
| 6,230,005 B1 * | 5/2001 | Le et al. ...................... 455/414 |
| 6,321,090 B1 * | 11/2001 | Soliman ...................... 455/440 |

FOREIGN PATENT DOCUMENTS

| | | | |
|---|---|---|---|
| WO | WO 96/23369 | 8/1996 | |
| WO | WO 97/42779 | 11/1997 | |
| WO | WO 98/52375 | 11/1998 | ............ H04Q/7/38 |

* cited by examiner

Primary Examiner—Thanh Cong Le
Assistant Examiner—Tuan T. Nguyen
(74) Attorney, Agent, or Firm—Kenneth A. Haas

(57) ABSTRACT

A cellular communications system permits handover of a group of mobile stations (15) having like characteristics from a base station (13) operating in one type of network e.g. UMTS to a base station (16) operating in a different type of network e.g. GSM, or from a first carrier frequency to a second carrier frequency both being supported by the same base station, thereby relieving congestion in an overloaded cell by handing over a group of calls to an under-loaded one. The invention has the benefits of enabling such a handover with the minimum of signalling overhead.

16 Claims, 3 Drawing Sheets

GROUP HANDOVER IN A CELLULAR COMMUNICATIONS NETWORK

FIELD OF THE INVENTION

This invention relates to cellular communications systems and particularly to group handover procedures for reducing congestion in a cellular network.

BACKGROUND OF THE INVENTION

Cellular radio telecommunications networks generally include mobile services switching centres (MSC) coupled to a public switched telephone network (PSTN), base transceiver stations (BTS) and radio telephone subscriber units often referred to as mobile stations.

Each of a plurality of base transceiver stations generally defines a geographic region or cell proximate to the BTS to produce coverage areas. Cell sizes range typically from 200 metres in diameter in urban areas to 60 kilometres in rural areas. Each BTS comprises the radio frequency components and the antenna for communicating with the mobile stations. The communication link from a BTS to a mobile station is called the downlink. Conversely, the communication link from the mobile station to the BTS is referred to as the uplink. Usually, several base transceiver stations are under the control of a base station controller (BSC) which in turn communicates directly by a land line or microwave link with an MSC. Several base station controllers may report to one MSC.

Multiple access techniques permit the simultaneous transmissions from several mobile stations to a single BTS. The GSM system (global system for mobile communications) uses time division multiple access (TDMA), in which a communications channel consists of a time slot in a periodic train of time intervals over the same frequency. Each mobile station is allocated one specific time slot for communication with a BTS in a repeating time frame. Another type of multiple access technique, and one proposed for the third generation universal mobile telecommunication system (UMTS) is known as Code Division Multiple Access (CDMA) which employs spread spectrum signaling. Individual users in the CDMA communications network use the same RF carrier frequency, but are separated by the use of individual spreading codes. Hence, multiple communications channels are allocated using a plurality of spreading codes within the portion of radio spectrum, each code being uniquely assigned to a mobile station. Further schemes involve combinations of both TDMA and CDMA.

By means of the aforementioned network components, a cellular network is able to (amongst other things) monitor the number of calls made by a mobile station, control the handover of the communications link from the mobile station to the base transceiver stations as it moves from one cell to another, calculate the round trip time (often referred to as the timing advance) of the communications link between the mobile station and the BTS and track a mobile station's location within the network by means of a location update sequence.

As the mobile station moves from one cell to the next, in a GSM network, for example, the communication link is transferred from its current BTS to a neighbouring BTS using a procedure known as handover or handoff. The need for handover is usually determined on the basis of one or more criteria. Commonly used criteria are received signal strength indication (RSSI) of the mobile station at the BTS, the distance from the current BTS as determined by the round trip time for signals to and from the mobile station and the bit error rate (BER).

There is a variety of methods by which a handover process can be initiated. Firstly, processes for initiating handover may make measurements on the uplink and downlink between the mobile station and the BTS and initiate handover when received signal levels, received quality levels or the timing advance (based on the round trip time) values separately exceed thresholds. Alternatively, processes for initiating handover may compare measurements of received signal strength with received quality to deduce that bad quality may be the result of interference. Further, processes for initiating handover may additionally make measurements from a number of neighbour cells and initiate handover based on the relative level of the signal received from the serving cell and from the neighbour cells. There is a finite limit to the number of mobile stations that a single BTS can support at any given time. Sometimes the demand can exceed this limit and the cell supported by the BTS then becomes congested.

A handover can also be initiated even when the mobile station is not moving between cells. This type of handover is referred to as a traffic handover and occurs when a serving cell is congested and a neighbouring cell is not. If the neighbour cell's coverage overlaps with the serving cell's, then handing over some individual calls from the congested cell to a less congested cell improves the situation temporarily in the congested one.

In a third scenario, a mobile station may be moving out of a cell controlled by a TDMA-operated network into a cell controlled by a CDMA-operated network, thereby requiring handover between two different multiple-access systems. One example of an arrangement for handing over an individual call between two such systems is described in the Applicant's co-pending Application WO-A-9623369.

If many mobile stations have to perform a handover during a short period of time, in order to de-congest an overloaded cell, for example, using one of the known aforementioned methods has a disadvantage of requiring a large signaling overhead. Further, in order not to degrade communications quality, the handover processes should be time-offset, therefore, the entire process takes a significant amount of time to complete. In the particular case of simultaneous multiple handovers from a UMTS to GSM system, many users would need to switch to a slotted mode of operation, consequently needing to increase their transmit power, thereby increasing battery power consumption and their contribution to interference to other users.

This invention aims to provide a mechanism for handing over a group of calls in progress so that congestion can be relieved in a given cell.

The invention further aims to facilitate handover between cells operating within the same network, e.g. GSM or between cells operating within different networks e.g. GSM and UMTS.

The invention also aims to facilitate a handover mechanism that can be implemented whether an individual mobile station or group of mobile stations is in motion or not.

The invention also aims to provide a group handover mechanism in which the signaling overhead is kept to a minimum.

Accordingly, the present invention consists of a radio telecommunications system including a base station serving a cell and for communicating with a plurality of mobile stations located within the cell, in which the system further includes;

means for monitoring a characteristic of transmissions between the base station and each mobile station, means for clustering into a group those mobile stations whose monitored characteristic meets a pre-determined first criterion, means for establishing a first communications link between the base station and all the mobile stations comprising the group, means for monitoring the cell parameter and for detecting when the parameter meets a predetermined second criterion, means for transmitting a handover signal when the cell parameter meets the second criterion, and means for establishing a second communications link and severing the first communications link in response to the handover signal.

The base station may comprise a BTS as previously described.

The means for monitoring a characteristic of transmissions may be located in a mobile station and/or in a BSC, a BTS or an MSC.

The means for monitoring a cell parameter may be located in a BTS, a BSC or an MSC.

The means for clustering may be located at a BTS, a BSC or an MSC.

The cell parameter may be the loading of the cell, the amount of resource available, available capacity or interference levels for example. If, for instance, the cell becomes congested to a point where the loading reaches a pre-set threshold, then a group handover is triggered.

The characteristic of the monitored transmissions between the base station and the mobile station may be, for example, the strength of a transmitted or received signal, signal quality, quality of service, bit error rate or timing advance or can relate to whether the transmissions are speech or some other form of data such as facsimile for example.

Mobile stations may be grouped according to whether they lie within a particular region of the cell, the region being defined by signal power measurements, for example. Alternatively, those mobile stations which are transmitting and receiving speech rather than some other form of data are clustered into the same group.

Some or all of the mobile stations may effect a handover from the first communications link to the second, depending on network status and requirements.

The invention supports both intra-system group handover and inter-system group handover. For example, if the base station has been configured to support communication on two frequencies, the invention allows group handover from one frequency to the other. Further, the invention allows all mobile stations in a group to be handed over to another base station which may form part of the same or even a different network. Thus, the second communications link may be a new link with the base station on a different frequency or it may be a link with a different base station. For example, the invention can enable handovers between TDD and FDD (frequency division duplex) systems and TDD and GSM systems.

Advantageously, the invention allows group handover to occur with the minimum of signaling by virtue of the grouping procedure and the transmission of a single handover instruction to all mobile stations.

The invention can be utilised for simultaneously handing over a group of mobile stations which are in a common transportation platform such as a train.

The invention enables populations of MS's to be exchanged between resources. This feature can be of a great benefit to network planners. For example, say an operator controls GSM and UMTS in FDD (frequency division duplex) mode. In certain circumstances, it may be beneficial to move, simultaneously, many mobile stations from one system to another in order to admit further calls. For instance if many voice callers are present on the UMTS FDD system, it can be useful to switch them over to GSM. The invention permits this with the minimum of signaling and time delay.

In one embodiment, the handover procedure is governed entirely by the base station which sends a handover signal to only those mobile stations in the clustered group.

In an alternative embodiment, all mobile stations within the cell receive a handover command from the base station and each mobile station plays a more active role by identifying whether or not it falls into the clustered group.

The clustered group may be confined between two threshold values. For example, the group could comprise those mobile stations whose received (uplink) power transmissions lie between two preset levels.

BRIEF DESCRIPTION OF THE DRAWINGS

Some embodiments of the invention will now be described by way of example only with reference to the drawings of which

DETAILED DESCRIPTION OF THE DRAWINGS

Figure 1:
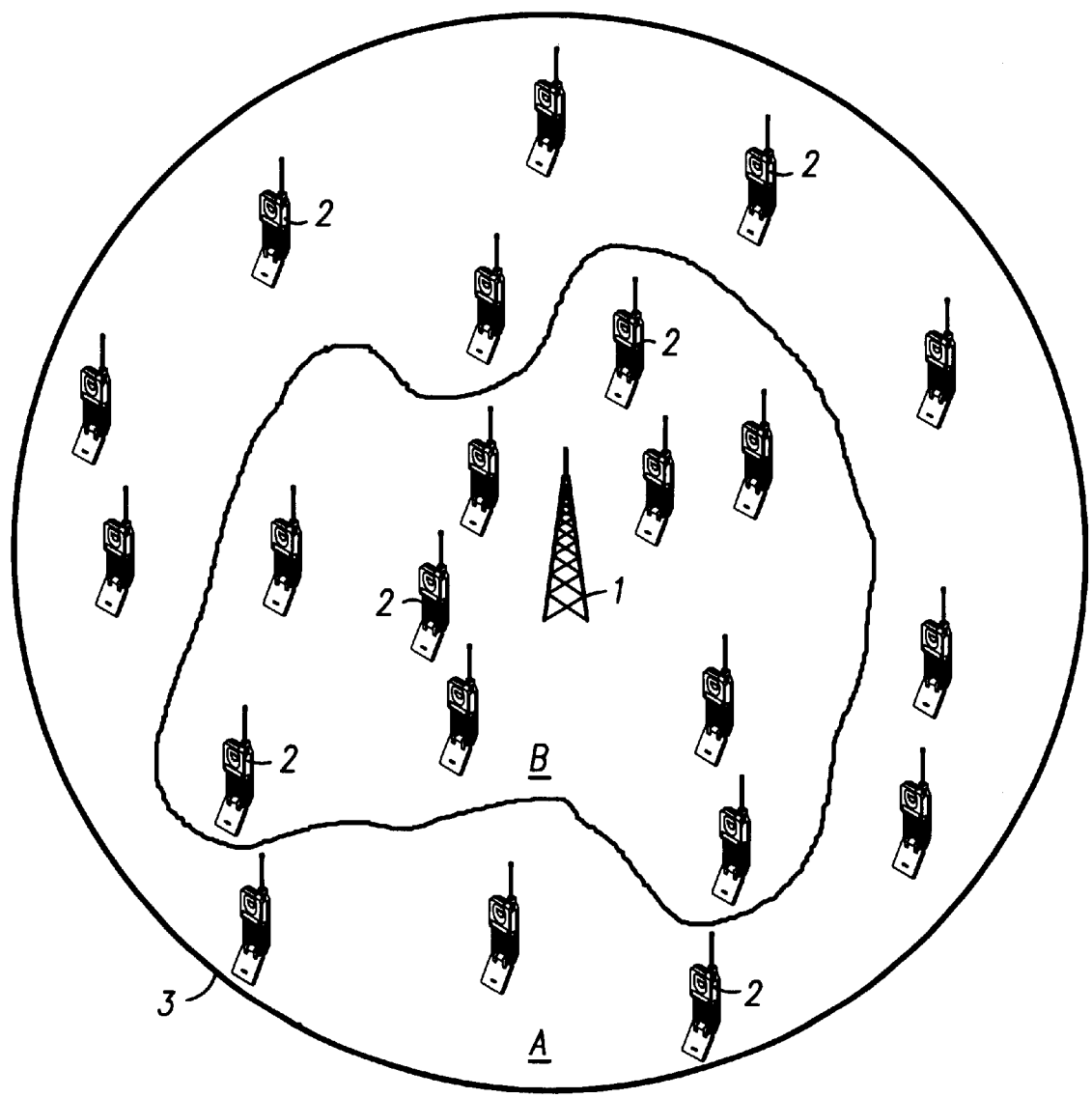
FIG. 1 is a schematic diagram of a cellular communication system operating in accordance with the invention.

In a first embodiment, consider a UMTS cellular communications network operating a CDMA system. In FIG. 1 a BTS 1 forms a part of such a network and is operable to communicate with a plurality of mobile stations 2 within its area of coverage or cell 3. BTS 1 is adapted to operate on two carrier frequencies F1 and F2.

Figure 2:
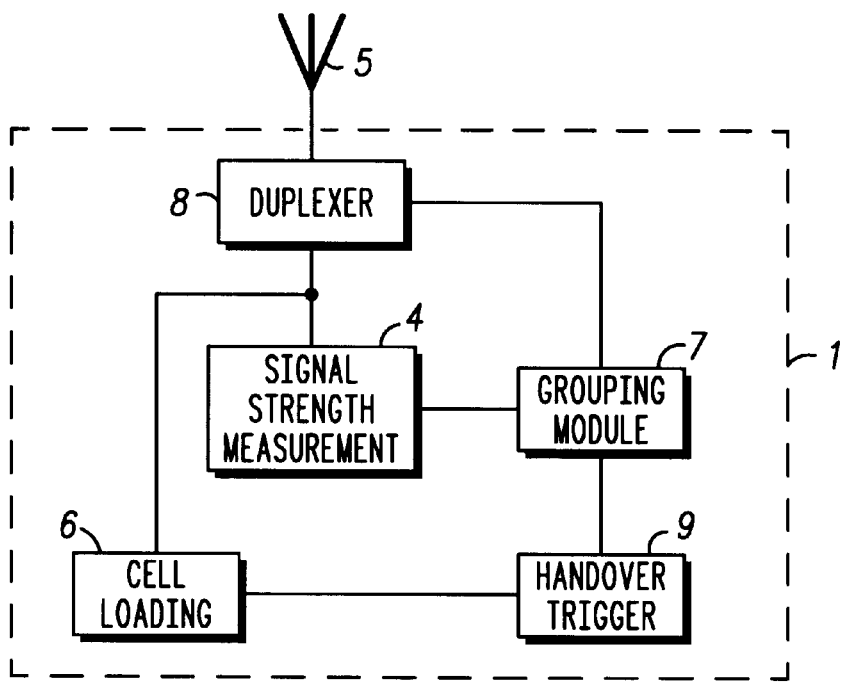
FIG. 2 is a schematic block diagram of a base transceiver station comprising the present invention.

Referring to FIG. 2, the BTS 1 includes a measurement module 4 for monitoring the signal strength of signals transmitted to and received from each mobile station 2 via an antenna 5. A cell loading measurement module 6 monitors the loading of the cell 3 by reference to the number of calls in progress and number of call set-up requests. The output of the signal strength measuring module 4 is fed to a grouping module 7 whose output is fed to the antenna 5 via a duplexer 8.

A handover trigger module 9 receives an input from the cell loading module 6. An output from the handover triggering module 9 is fed to the grouping module 7.

The operation of the first embodiment is as follows. Calls are established and progressed in accordance with usual practice by means of communication links between the BTS 1 and each mobile station 2 in the cell 3.

Also in accordance with usual practice, the BTS 1 and each mobile station 2 adjust their transmitted power outputs to take into account the distance between them and any interference effects. The BTS 2 controls the transmitted power level of both itself and each mobile station 2. The power received by each mobile station 2 is monitored thereby and reported back to the BTS 1. Using these measurements the transmit power of the BTS 1 and each mobile station 2 is set accordingly.

Whilst a call is in progress, the measurement module 4 monitors the BTS transmitted power to each mobile station and passes these measurements along with the corresponding mobile station's identity to the grouping module 7.

The grouping module 7 clusters those mobile stations whose received signal strength is below a pre-set threshold into a first group and those mobile stations whose received signal strength is equal to or exceeds the threshold into a second group. Hence, those mobile stations which lie within region A (see FIG. 2) form the first group and those which lie within region B fall into the second group.

The grouping module 7 thus assigns carrier frequency F1 to all mobile stations in region A and carrier frequency F2 to all mobile stations in region B and establishes the communications links accordingly via the duplexer 8.

The capacity of the inner part of the cell, region B, is greater than the outer part region A because mobile stations close to the BTS 1 are less affected by co-channel interference.

The cell loading module 6 constantly monitors the loading of the cell (on both frequencies F1 and F2). When this module detects that the number of calls supported on frequency F1 (in the outer part) reaches a pre-set threshold, yet there is still spare capacity in the inner part of the cell on frequency F2, it notifies the handover trigger module 8 that this saturation point has been reached.

In response, the handover trigger module 9 directs the grouping module 7 to generate a handover instruction to all those mobile stations in the first group, to relinquish communication with the BTS 1 on frequency F1 and switch to communication on frequency F2.

All the mobile stations in the first group affect this handover in accordance with known techniques.

The handover is completed for all mobile stations in the first group substantially simultaneously and the handover instruction from BTS 1 to each mobile station is performed in accordance with known procedures.

Figure 3:
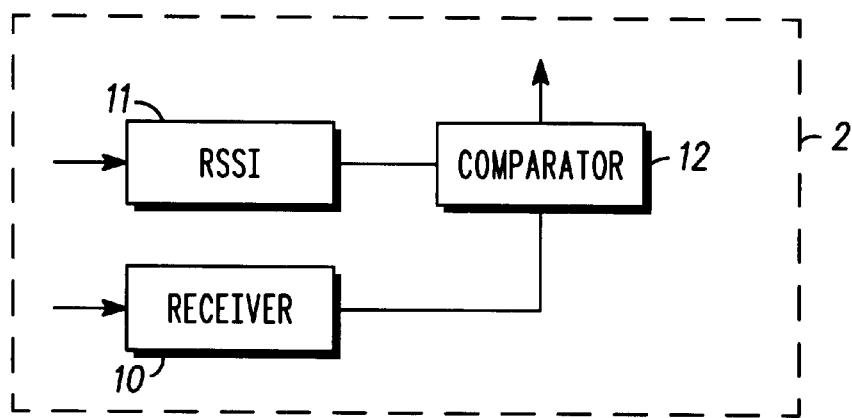
FIG. 3 is a schematic block diagram of a mobile station comprising the present invention.

In a second embodiment, the mobile stations are adapted to play a more active role in the handover process. In this second embodiment, the BTS 1 is configured as in FIG. 2. With reference to FIG. 3, each mobile station 2 in addition to its usual constituents which include a received signal strength indicator RSSI 11, it also includes a receiving module 10 for receiving a power threshold value from BTS 1. Outputs from module 10 and RSSI 11 are fed to a further additional module which is a comparator 12.

The operation of the second embodiment is as follows. Whilst calls are in progress, the measurement module 4 monitors the BTS transmitted power to each mobile station and passes these measurements to the grouping module 7.

The grouping module 7 clusters those mobile stations whose received signal strength is below a pre-set threshold into a group and notes the number n of mobile stations forming this group. This module assigns carrier frequency F1 to all mobile stations in this group and establishes the communications links accordingly via the duplexer 8.

When the cell loading module 6 detects that a handover of the aforementioned group of mobile stations from carrier frequency F1 to F2 is advisable, it notifies the handover trigger module 9. In response, the handover trigger module 9 directs the grouping module 7 to generate a handover message to all mobile stations 2 in the cell. This handover message is somewhat more complex than the instruction transmitted in the first embodiment. Specifically, the handover message includes the value of the pre-set threshold for the received downlink power measurements and the number of frames F during which a mobile station has to perform certain measurements to be described below.

Depending on the value of n and the quality of service that the network operator wants to offer, the grouping module computes the value for F. (This computation may be done remotely at the MSC, say, and then notified to the BTS 1).

At each mobile station 2, on receipt of the handover message, the mobile station 2 performs the following operations. Firstly, the receiving module 10 notes the values of F and threshold value and initiates a comparison of downlink power measurements from the RSSI 11 with the threshold value. The comparison is done in the comparator 12. If the received downlink power measurements is equal to or exceeds the threshold then the mobile station 2 in question is not a member of the group and so no further action is taken. If the received downlink power measurement is below the threshold, then the mobile station in question is identified as one of the group of n mobile stations. The comparator 12 then passes on a handover instruction to the appropriate (conventional) circuitry (not shown) in the mobile station 2 which randomly chooses an interval to perform the usual handover measurements. This interval will lie within the subsequent F frames. Since there are 3 possibilities to operate in a slotted mode (mid-frame, start of frame or end of frame idle period) the mobile station has three F opportunities to perform the measurements.

After having completed all the necessary handover measurements, each mobile station 2 (which has identified itself as belonging to the group) switches to frequency F2. When the BTS 1 receives an uplink signal on F2 for a given mobile station, it breaks the link on F1.

If after a time-out period, it is apparent to the BTS 1 that not all mobile stations in the group have handed over to frequency F2, then it may send out another handover message or it may initiate an individual handover instruction to the mobile station in question.

Compared with conventional, individual intra-network handover techniques, the above embodiments of the present invention have a lower overall switching time as the overall handover process itself is much reduced. Further, the signaling required is minimised. Also, the process is seamless as it is a"make before break" process.

In the embodiments described above it has been assumed that the spreading code assigned to a mobile station is the same for both frequency F1 and frequency F2. This implies that some mobile stations are already communicating on frequency F2 (located within a radius R2) will need to change their spreading code. Mechanisms for doing this are known.

Figure 4:
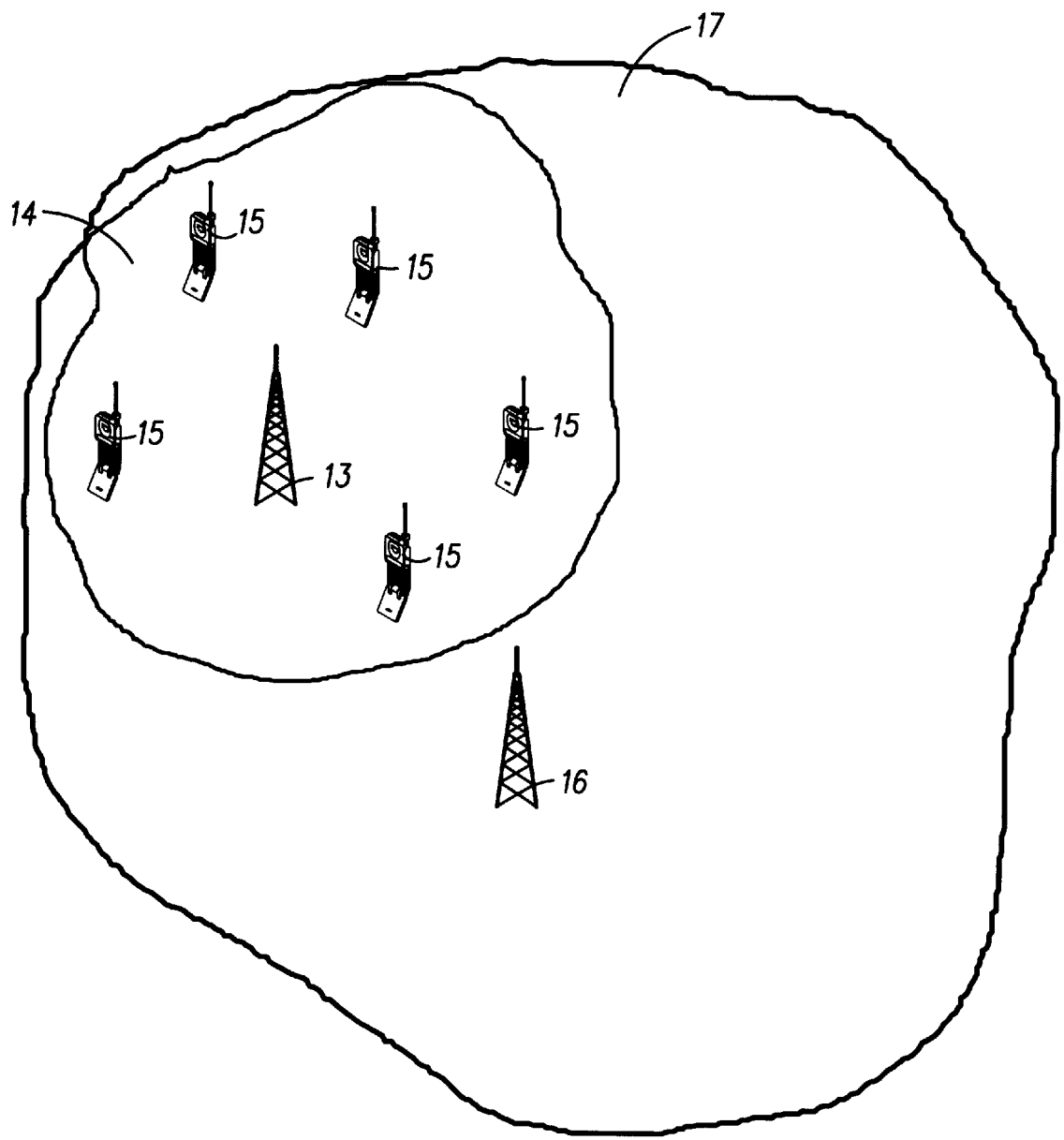
FIG. 4 is a schematic diagram of two cellular communication networks operating in accordance with the invention.

Referring now to FIG. 4, a first BTS 13 serves a first cell 14 including several mobile stations 15 and comprises the same components as the BTS 1 described above with reference to FIG. 2. The BTS 13 operates in a UMTS system.

A second BTS 16 which operates in a GSM system serves a second cell 17 which overlaps the first cell 14.

In this example, the mobile stations 15 are initially supported by the BTS 13 on the UMTS system, but this BTS is so highly loaded that it cannot accept a new incoming data call. Further, the data rate required by the incoming call is too high to be supported by the GSM system. This situation can be ameliorated by handing over the voice calls being served on the UMTS system (by the BTS 13) to the GSM system (served by the BTS 16).

In the BTS 13, the received signal strength module 4 and grouping module 7 (of FIG. 2) are modified to monitor and identify those mobile stations within the cell 14 which are conducting voice calls.

Some or all of those mobile stations so identified are sent handover messages in a manner according to either of the above embodiments previously described with reference to FIGS. 2 and 3. In this instance, the handover message instructs the mobile station in question to set up a link with the second BTS 16.

A "make before break" handover can only be effected if a fast and reliable link exists between the UMTS and GSM networks. Otherwise, the handover command includes an index which indicates to the mobile station during which frame the change of system must occur.

Another situation in which a group handover from UMTS to GSM is advantageous is the case where prolonging a data service currently served by UMTS would violate bit error rate or interference level (CIR) requirements. The embodiment of FIG. 4 can be configured to initiate a group handover procedure whereby some mobile stations are moved from the UMTS system to the GSM system in order to release some resources in a UMTS TDD (time division duplex) mode of operation or to reduce interference in a UMTS FDD mode of operation.

We claim:

1. Radio telecommunication apparatus including a base station serving a cell and for communicating with a plurality of mobile stations located within the cell, in which the system includes;

means for monitoring a characteristic of transmissions between the base station and each mobile station, means for clustering into a group those mobile stations whose monitored characteristic meets a pre-determined first criterion, means for establishing a first communication link between the base station and at least all the mobile stations comprising the group, means for monitoring a cell parameter and for detecting when the parameter meets a pre-determined second criterion, means for transmitting a group handover signal to all the mobile stations comprising the group when the cell parameter meets the second criterion, and means for establishing a second communications link and for severing the first communication link between at least some of the mobile stations comprising the group and the base station in response to the group handover signal.

2. Radio telecommunication apparatus as claimed in claim 1 in which the base station supports communications with the plurality of mobile stations on first and second frequencies and in which the first communications link is established on the first frequency and the second communications link is established on the second frequency.

3. Radio telecommunication apparatus as claimed in claim 1 in which the second communications link is established with another base station.

4. Radio telecommunication apparatus as claimed in claim 1 in which the monitored characteristic of transmissions and the first criterion comprise signal strength.

5. Radio telecommunication apparatus as claimed in claim 1 in which the monitored characteristic of transmission and the first criterion comprise an indicator of whether the transmission is a speech transmission.

6. Radio telecommunication apparatus as claimed in claim 1 in which the cell parameter relates to the loading of the cell.

7. Radio telecommunication apparatus as claimed in claim 1 and further including a mobile station having means for identifying said mobile station as belonging to the clustered group.

8. Radio telecommunication apparatus as claimed in claim 1 in which the group handover is an inter-system handover.

9. Radio telecommunication apparatus as claimed in claim 1 in which the base station is arranged to send a group handover signal to only those mobile stations in the clustered group.

10. Radio telecommunication apparatus as claimed in claim 1 in which the base station is arranged to send a group handover signal to all the mobile stations in the cell and each mobile station identifies whether or not it falls into the clustered group.

11. A method of operating a radio telecommunication system, said system including a base station serving a cell and for communicating with a plurality of mobile stations located within the cell, in which the method includes the steps of;

monitoring a characteristic of transmissions between the base station and each mobile station, clustering into a group those mobile stations whose monitored characteristic meets a pre-determined first criterion, establishing a first communications link between the base station and at least all the mobile stations comprising the group, monitoring a cell parameter, detecting when the cell parameter reaches a pre-determined second criterion, transmitting a group handover signal to all the mobile stations comprising the group when the cell parameter meets the second criterion, and establishing a second communications link and severing the first communications link between at least some of the mobile stations comprising the group and the base station in response to the group handover signal.

12. A method as claimed in claim 8 in which the mobile stations are clustered into groups depending upon the signal strength of the transmissions between the base station and the mobile stations.

13. A method as claimed in claim 8 in which the mobile stations are clustered according to whether the transmission is a speech transmission.

14. A method as claimed in claim 11 in which the group handover is an intersystem handover.

15. A method as claimed in claim 11 in which the base station sends a group handover signal to only those mobile stations in the clustered group.

16. A method as claimed in claim 11 in which the base station sends a group handover signal to all the mobile stations in the cell and each mobile station identifies whether or not it falls into the clustered group.

* * * * *